United States Patent [19]

Michalak et al.

[11] 3,867,000

[45] Feb. 18, 1975

[54] LATCHING SPRING CLIP DEVICE FOR SECURING ELECTRICAL CABLE CONNECTORS TO PRINTED WIRING CARDS

[75] Inventors: Bogumil M. Michalak, Melrose Park; Ansano Bertellotti, Addison, both of Ill.

[73] Assignee: GTE Automatic Electric Laboratories Incorporated, Northlake, Ill.

[22] Filed: Sept. 10, 1973

[21] Appl. No.: 396,021

[52] U.S. Cl. .............. 339/17 L, 317/101, 339/91 R

[51] Int. Cl. .............................................. H05k 1/02

[58] Field of Search .......... 317/101; 339/17, 18, 19, 339/45, 75, 91, 176; 248/27, 300

[56] References Cited

UNITED STATES PATENTS 2,899,669 8/1959 Johanson ...................... 339/91 R X 3,599,920 8/1971 Hoegerl ..................... 339/17 LM X 3,706,954 12/1972 Krafthefer ......................... 339/17 L

FOREIGN PATENTS OR APPLICATIONS 6,405,509 11/1965 Netherlands ..................... 339/91 R

*Primary Examiner*—Roy D. Frazier

*Assistant Examiner*—Terrell P. Lewis

[57] ABSTRACT

Apparatus for detachably securing electrical cable connectors to printed wiring cards is disclosed. In an embodiment of the invention, the apparatus comprises a latching spring clip device mounted on a Z-shaped stiffener bracket affixed to the printed wiring card. As the connector housing is mated with the printed wiring card, a pair of spaced tabs associated with an outwardly extending spring member slide on a correspondly spaced pair of inclined riders on the housing, hooking over the back edges of the riders when the housing is mated with the printed wiring card.

5 Claims, 4 Drawing Figures

LATCHING SPRING CLIP DEVICE FOR SECURING ELECTRICAL CABLE CONNECTORS TO PRINTED WIRING CARDS

BACKGROUND OF THE INVENTION

This invention relates generally to electrical connectors and more particularly to apparatus for securing cable connector housings to printed wiring cards.

Reference may be made to the following U.S. Pat. Nos. 3,569,909, 3,369,214; 3,697,928; 3,671,921; and 3,651,446.

Printed wiring cards having electrical components mounted thereon are in general use in the electronics industry to facilitate the compact arrangement of complex circuitry. Such cards generally comprise a thin, rigid board of insulating material having a layer of conductive strips disposed thereon to form the signal wiring pattern for a desired circuit or circuits interconnecting electrical components mounted on the card.

External connections with the card are often made by coupling a cable to a connector housing which, in turn, is mounted on a bracket at the edge of the card to complete the connection to the conductive strips. On occasion, however, there may be reason to detach a particular connector housing from its card, e.g., to replace or remove a cable and/or the card to which it is secured.

Consequently, although means should be provided for securely fastening the connector housing to the printed wiring card to prevent its accidental detachment, such means should also provide for the quick and easy removal of the housing from the card when required. Moreover, the cable connector housing and the securing apparatus should be re-usable as well as inexpensive.

SUMMARY OF THE INVENTION

In accordance with the present invention, there is provided an apparatus for detachably securing an electrical cable connector housing to a printed wiring card to complete an electrical connection. More particularly, the apparatus includes a substantially Z-shaped stiffener bracket mounted on the printed wiring card adjacent to a connector flange extending therefrom. A latching device removably mounted on the bracket comprises a spring member extending outwardly in parallel alignment with the connector flange. A pair of spaced tabs at the free-moving end of the spring member engage a pair of correspondingly spaced inclined riders disposed on the connector housing as the housing slidably engages the connector flange. As the connector housing is mated with the connector flange, the spring member is biased outwardly as the spaced tabs slide up the inclined riders. Upon the housing being fully mated with the connector flange, the spaced tabs hook over the back edges of the inclined riders, slipping into a well in the connector housing to secure the housing to the printed wiring card. The housing is released by inserting a tool between the spaced inclined riders to force the spring member away from the housing until the spaced tabs disengage the back edges of the inclined riders.

BRIEF DESCRIPTION OF THE DRAWINGS

The invention may be best understood, however, by reference now to the following description taken in conjunction with the accompanying drawings, in which like reference numerals identify like elements in the several figures and in which.

DETAILED DESCRIPTION

Figures 1, 2:
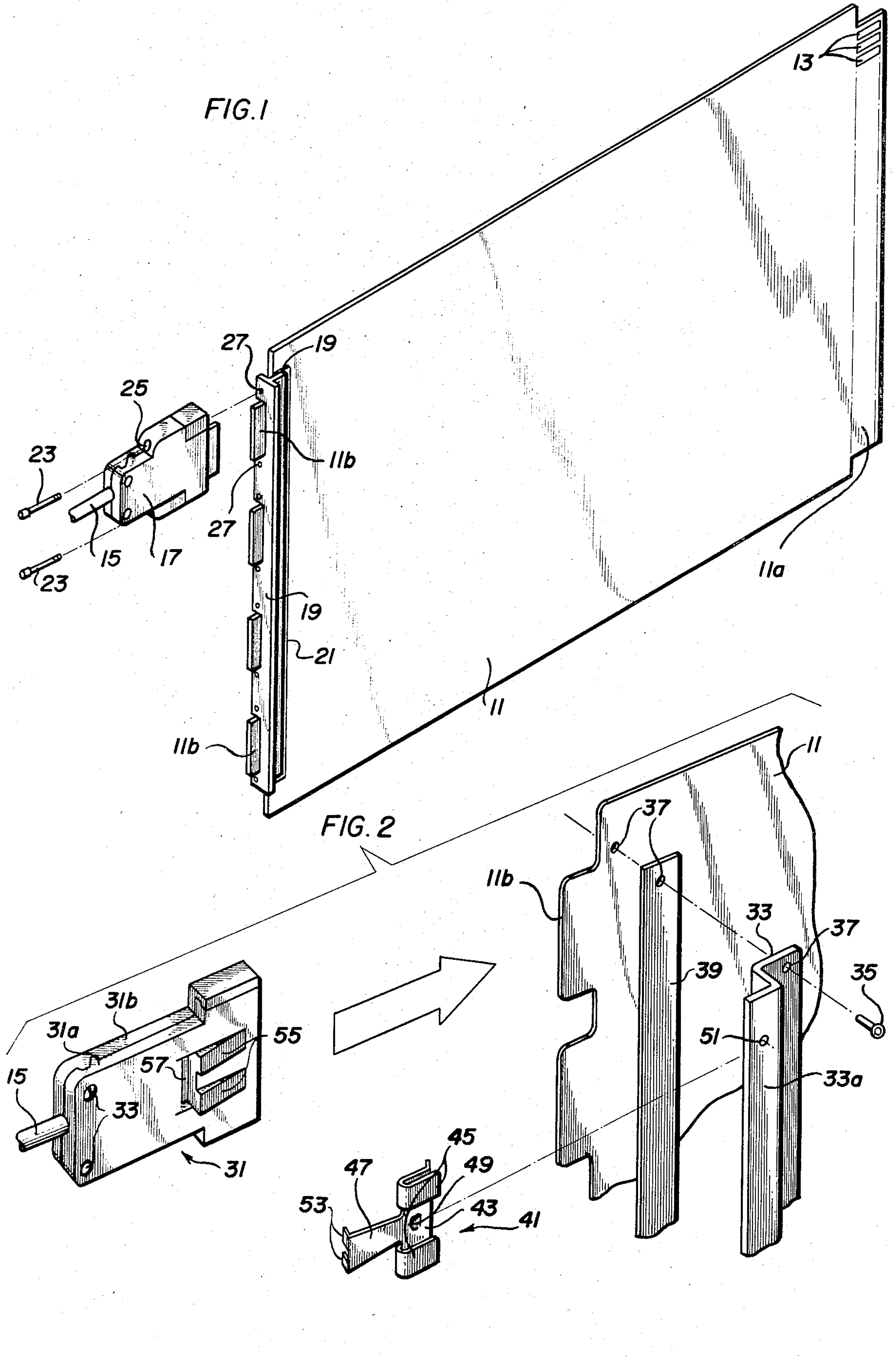
FIG. 1 is a partially exploded perspective view illustrating a prior art cable connector assembly for connecting an electrical cable to a printed wiring card.
FIG. 2 is an exploded perspective view of apparatus in accordance with the present invention for securing a cable connector housing to a printed wiring card.

With reference now to FIG. 1, there is shown an example of representative prior art cable connector assembly including a cable housing which can be mounted on a printed wiring card to complete an electrical circuit.

In particular, the printed wiring card 11 shown there is somewhat standard, typically comprising a flat rectangular board of non-conductive material having on one side thereof a layer of conductive metallic strips forming the particularized signal wiring pattern for a desired circuit. The conductive circuit strips terminate in a plurality of conductive connector tabs 13 which are disposed along an integral co-planar flange 11*a* at one end of the printed wiring card 11. The flange 11*a* is insertable into a corresponding connector socket (not shown) to connect selected signal points in the circuit to other circuits on other cards or the like.

External connections may also be made with various signal points in the circuit by means of a cable 15 coupled to the printed wiring card 11 through a cable connector housing 17 mounted on card 11. Typically, the prior art housing 17, such as that shown in FIG. 1, has a cavity (not shown) opening on its front edge which slidably mates with a corresponding one of a plurality of connector flanges 11*b* extending from the printed wiring card 11. Electrical contact is made internally in connector housing 17 between conductive tabs on flange 11*b* and contacts coupled to cable 15 in housing 17.

In order to prevent the accidental detachment of the connector housing 17 from the printed wiring card 11, the housing 17 is secured to a T-shaped aluminum extrusion or stiffener bracket 19 affixed to the printed wiring card 11 adjacent the flanges 11*b*. An insulator 21 is interposed between the bracket 19 and the printed wiring card 11. As may be seen more clearly in FIG. 1, portions of one member of the T-shaped stiffener bracket 19 are cut-away, allowing the flanges 11*b* to protrude therethrough to engage one or more corresponding connector housings 17. A pair of screws 23 pass through holes 25 provided in the housing 17 to engage corresponding tapped holes 27 in the stiffener bracket 19 thereby securing the cable connector housing 17 to the printed wiring card 11.

Thus, while these prior art cable connector assemblies do permit the external connection of electrical cables 15 to the printed wiring cards 11, the connector housing 17 is not readily detachable from the card; that is, the screws 23 must first be removed. Moreover, the tapped holes 27 in the aluminum stiffener bracket 19 are easily stripped by excess torque applied thereto or by improper threading when the screw 23 is initially started in the tapped hole 27. Consequently, if the threads of a particular tapped hole 27 are stripped, the stiffener bracket 19 must be replaced before another connector housing 17 can be attached to the printed wiring card 11 at that particular location. This, of course, is not desirable because of the expense incurred in machining the T-shaped stiffener bracket 19 and providing tapped holes 27.

Figures 3, 4:
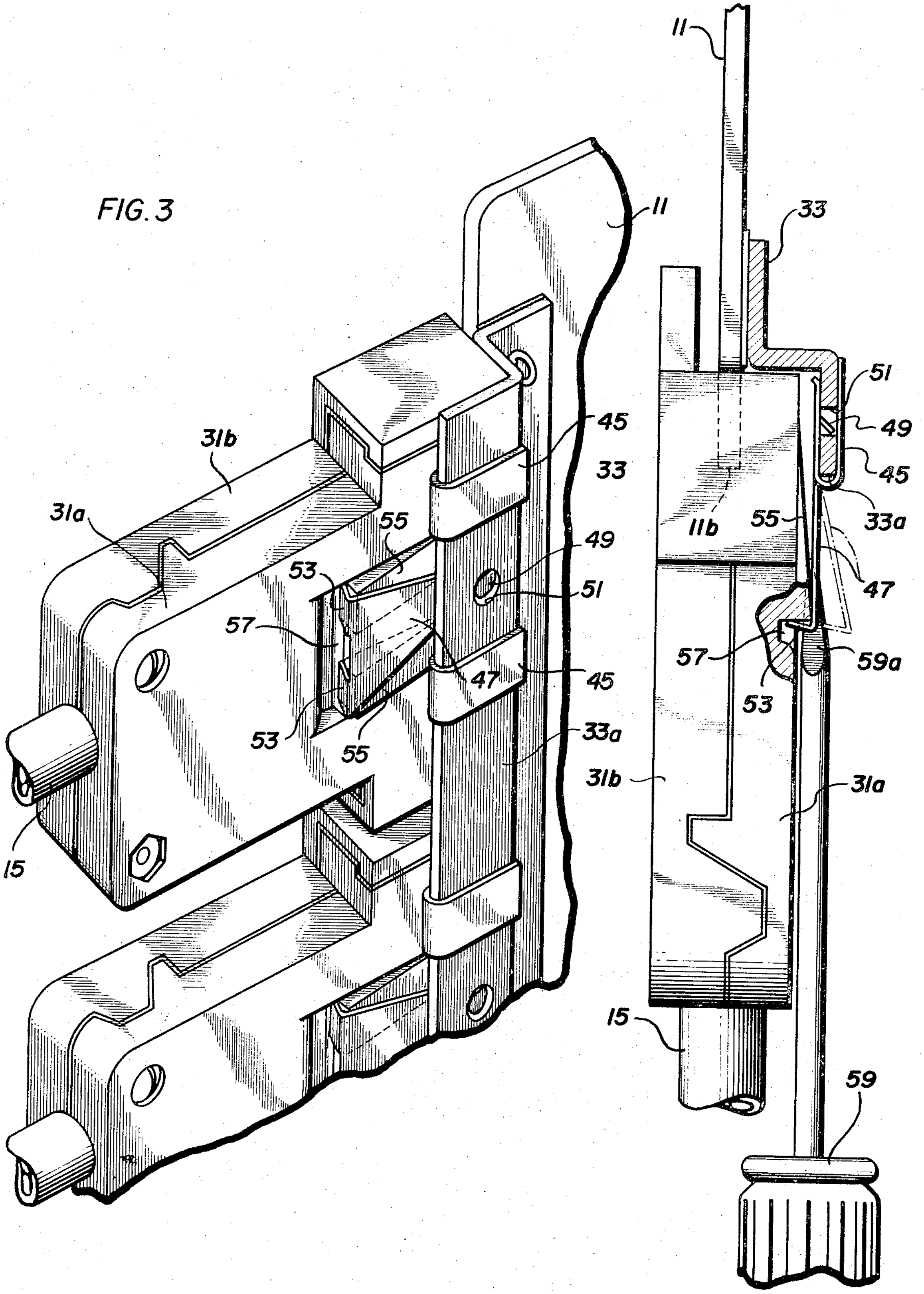
FIG. 3 is a perspective view showing the essential elements of the apparatus shown in FIG. 2 as they appear when the cable connector housing is secured to the printed wiring card.
FIG. 4 is a partially cut-away side elevational view illustrating a method used in detaching the cable connector housing from the printed wiring card.

Referring now to FIGS. 2 and 3, there is shown apparatus in accordance with the present invention for detachably securing a specially adapted cable connector housing to a printed wiring card.

More particularly, the connector assembly of the present invention includes a housing 31 comprising a pair of interlocking shell portions 31*a* and 31*b*. When assembled, the shell portions 31*a* and 31*b* are self-locking so that a pair of screws 33 at one end of housing 31 are sufficient to hold the housing 31 together. As in the prior art arrangement previously described, a cable 15 is coupled to contacts inside the housing 31 which slidably engage the conductive tabs on connector flange 11*b* when the printed wiring card 11 engages the cavity (not shown) opening on the front edge of the connector housing 31. Thus, when the housing 31 is mated with flange 11*b*, an electrical connection is completed between the cable 15 and the corresponding signal points on the printed wiring card 11.

A substantially Z-shaped steel stiffener bracket 33 comprising a pair of parallel members joined by a perpendicular member is mounted on the printed wiring card 11 adjacent the connector flanges 11*b* by means of a plurality of fasteners such as eyelets 35 extending through corresponding holes 37 in the stiffener bracket 33 and card 11. A strip of insulating material 39 is interposed between the stiffener bracket 33 and the printed wiring card 11.

A latching spring clip device, identified generally at 41, is mounted on the stiffener bracket 33 to secure the housing 31 to the printed wiring card 11. In the present embodiment, for example, the latching spring clip device may comprise a single piece of heat-treated spring steel about 0.015 inches thick.

In particular, the latching device 41, as may be seen in FIG. 2, is substantially T-shaped, comprising a cross member 43 having a U-shaped flange or clip 45 either end thereof for mounting the latching device 41 on the stiffener bracket 33 and a spring member 47 normal to cross member 43. The latching spring clip device 41 is mounted on stiffener bracket 33 by sliding the U-shaped flanges 45 onto member 33*a* of bracket 33. The U-shaped flanges 45 are biased to exert pressure against member 33*a*, holding the latching device 41 in position thereon.

A barb-like tab 49 extends outwardly from the cross member 43 and snaps into a perforated hole 51 in the stiffener bracket member 33*a* to prevent the accidental detachment of the latching device 41 from the stiffener bracket 33. Hole 51 is positioned to correspond substantially to the center line of connector flange 11*b* so that the perpendicular spring member 47 extends outwardly from cross member 43 in substantially parallel spaced alignment with flange 11*b*. A pair of spaced tabs 53 at the free-moving end of spring member 47 extend inwardly toward flange 11*b* and slightly back toward the stiffener bracket 33.

In accordance with the present invention, the connector housing 31 is substantially modified to engage the latching device 41 attached to the stiffener bracket 33 thereby permitting the housing 31 to be secured to the printed wiring card 11.

The housing 31 of the present invention incorporates a pair of inclined riders 55 integrally formed on the surface of shell portion 31*a*. The inclined riders 55 comprise a pair of ramp-like protrusions extending from a point near the front of the housing 31 to an intermediate point at the middle of housing 31, ending sharply at its back edge in a well 57. The well 57 comprises a small rectangular area adjacent the back edge of the inclined riders 55 which extends below the surface of the otherwise substantially planar surface of shell 31*a*. Moreover, the ramp-like riders 55 are spaced to correspond to the spacing between the tabs 53 on spring member 47 of the latching device 41.

Operationally, when the housing 31 is slidably mated with connector flange 11*b* to engage the printed wiring card 11, the spaced tabs 53 engage the inclined riders 55 at the point near the front of housing 31. As the housing 31 is slid onto flange 11*b*, the spaced tabs 53 ride up the inclined riders 55 so that, in turn, the perpendicular spring member 47 is increasingly biased outwardly from its normal position. Upon the housing 31 being fully mated with flange 11*b*, the spaced tabs 53 reach the back edge of the riders 55 at which time the biased spring member 47 is released. Consequently, the spaced tabs 53 latch over the back edge of the inclined riders 55 and drop into well 57, securing the connector housing 31 to the printed wiring card 11. FIG. 3 shows the connector housing 31 secured to the printed wiring card 11 by the latching spring clip device 41.

Another feature of the securing apparatus of the present invention is that the connector housing 31 is easily detached from the printed wiring card 11. This is accomplished by forcing spring member 47 away from the housing 31 until the spaced tabs 53 disengage the well 57 and the back edges of the inclined riders 55, permitting the disengagement of housing 31 from connector flange 11*b*.

A preferred method of releasing the housing 31 is shown in FIG. 4. There, the blade 59*a* of a screwdriver 59 is inserted beneath spring member 47 and between the spaced tabs 53 and the correspondingly spaced inclined riders 55. The screwdriver 59 is then manually forced outward against the spring member 47 until the spaced tabs 53 are released. Moreover, the latching spring clip device 41 can itself be removed from the stiffener bracket 33 by inserting a pointed tool into perforated hole 51 to press the barb-like tab 49 downward until it disengages the side of hole 51, releasing the latching device 41 from stiffener bracket 33.

Accordingly, there has been shown apparatus for detachably securing the housing of an electrical connector assembly to a printed wiring card. The simple construction of the apparatus makes it relatively inexpensive and permits the connector housing to be secured or detached from the printed wiring card with little effort.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. Apparatus for securing an electrical cable connector to a printed wiring card, said cable connector including a housing slidably mating with a connector on said printed wiring card to complete an electrical connection, said apparatus comprising:

a latching device mounted on said printed wiring card comprising a single flat spring member extending outwardly therefrom in substantial parallel spaced alignment therewith and having a pair of spaced tabs extending normally therefrom toward said connector on said printed wiring card;

a pair of inclined riders on said housing ending at respective back edges and spaced to correspond to said spaced tabs, said tabs engaging said inclined riders and sliding thereon as said housing is mated with said connector on said printed wiring card until said tabs hook over said back edges to secure said housing to said printed wiring cards; and a stiffener bracket mounted on said printed wiring card adjacent said connectors, said latching device being mounted on said stiffener bracket.

2. Apparatus in accordance with claim 1 wherein said latching device is substantially T-shaped comprising said spring member and a substantially coplanar cross member disposed perpendicular thereto, said cross member having a U-shaped clip at each end for engaging said stiffener bracket to mount said latching device on said printed wiring card.

3. Apparatus in accordance with claim 1 wherein said stiffener bracket is substantially Z-shaped comprising first and second parallel members joined by a perpendicular member, said first parallel member being used to mount said bracket on said printed wiring card and said latching device being detachably mounted on said second parallel member.

4. Apparatus in accordance with claim 1 including means for preventing the accidental detachment of said latching device from said stiffener bracket.

5. Apparatus in accordance with claim 4 wherein said means comprises a barb-like tap extending from said latching device and a hole in said stiffener bracket, said barb-like tab engaging said hole when said latching device is mounted on said stiffener bracket.

* * * * *